H. A. ARCHEREAU.
Artificial Fuel.
No. 23,005.
Patented Feb. 22, 1859.
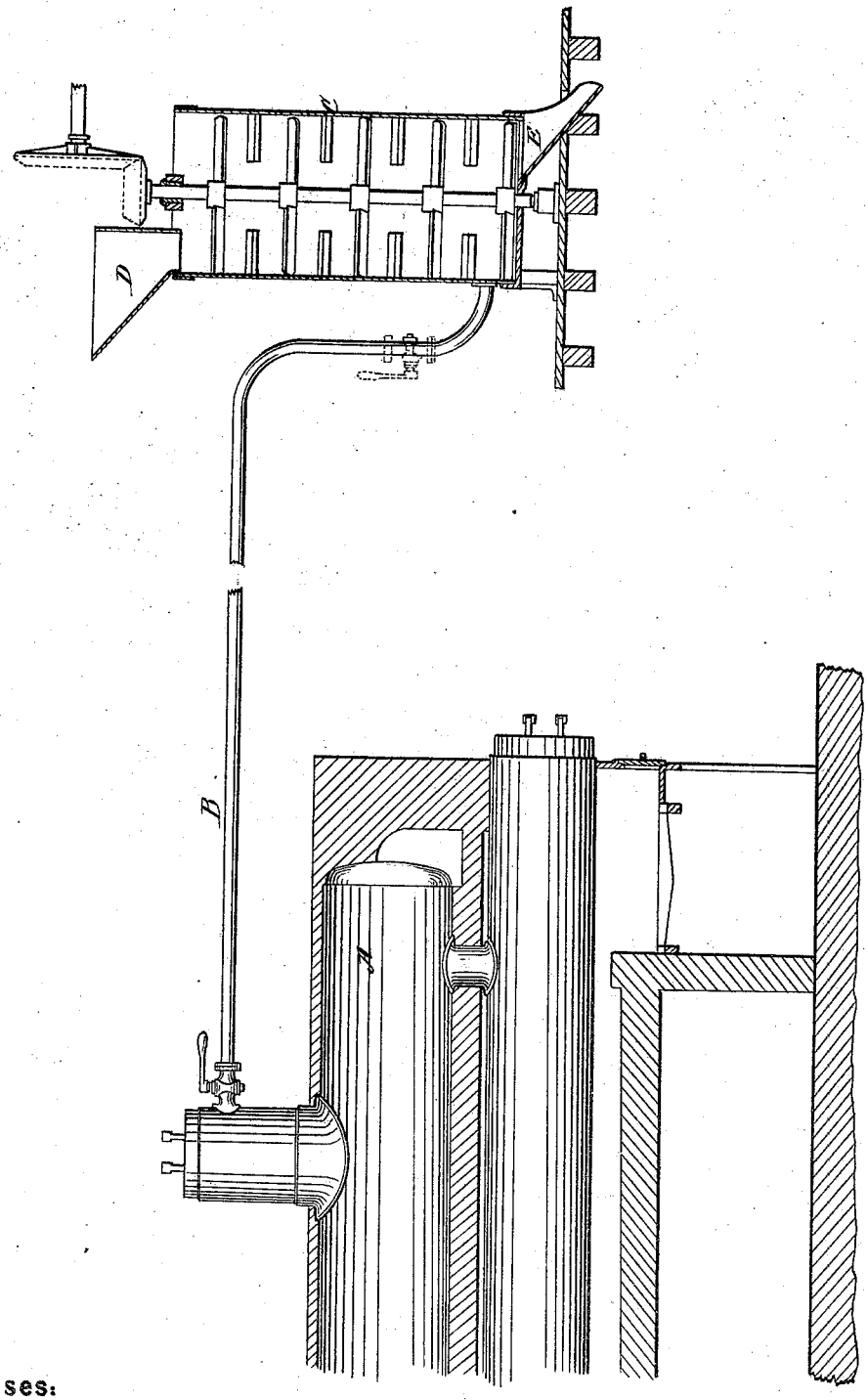
Witnesses:
Inventor:

UNITED STATES PATENT OFFICE.

HENRY ADOLPHE ARCHEREAU, OF PARIS, FRANCE.

PREPARATION OF ARTIFICIAL FUEL.

Specification of Letters Patent No. 23,005, dated February 22, 1859.

*To all whom it may concern:*

Be it known that I, HENRY ADOLPHE ARCHEREAU, of Paris, in the Empire of France, have invented a new and useful Mode of Treating and Combining Various Combustible Matters or Substances for the Production of Artificial Fuel; and I hereby declare the nature of said invention and in what manner the same is to be performed to be particularly described and ascertained in and by the following statement—that is to say—

This invention relates to the mode of treating coal dust or small coal, peat turf lignite, rosin, pitch, tar and other resinous, carbonaceous or combustible matters or substances, so as to cause them to agglomerate or combine together, in order to produce a solid mass which may be molded into any convenient form and used as artificial fuel.

The invention consists in stirring and mixing the pulverized carbonaceous or combustible materials together, and while they are in motion causing a jet or current of hot air, steam or vapor to pass through the mass so as to soften the particles and allow them to agglomerate or stick together when they are molded or discharged from the pug-mill or mixing apparatus.

The hot air, steam or vapor, must be passed continuously through the mass while the materials are being stirred, otherwise the mass will become too stiff to be worked with facility. If desired, the hot air or steam may be made to operate upon the small coal or coal dust alone in the first instance, so as to heat or soften it, after which the heated or softened coal may be passed into another apparatus, in order to be mixed with the resinous and other matters of which the artificial fuel is composed.

Some coals will be found to be so highly bituminous as not to require the addition of pitch or resinous matter to assist in agglomerating the particles. In such cases it will be necessary to raise the temperature of the steam, hot air, or vapors to such a degree as will effectually soften the particles so as to admit of the mass being molded into any required form. Either natural or superheated steam may be used according to the nature of the materials to be operated upon, and the steam, hot air or vapors must be under pressure sufficient to cause it to force its passage through the mass of materials while they are in motion.

The passage of the steam, hot air or gases should be continued until the materials are well mixed and have apparently agglomerated, when the mass may be removed from the mixing vessel and molded if required, after which the lumps may be allowed to cool.

I would observe that I have not thought it necessary to state any precise proportions in which the ingredients are to be mixed, as they must necessarily vary to a considerable extent according to the nature of the materials employed. For instance, a dry smokeless coal or anthracite coal will require a larger proportion of pitch or resinous or bituminous matter than an equal quantity of highly bituminous coal, the principal use of the pitch, tar, or resinous or bituminous matter being to assist in agglomerating the other particles, the exact proportion thereof to be added must be left to the discretion of the manufacturer.

A modification of the process consists in forcing hot air, steam, or gases through a mass of melted pitch, rosin, tar, or other analogous matters until the mass is worked up into a froth, when the dry pulverized ingredients may be added and well mixed until the proper consistence is obtained, after which the mass may be removed from the pug-mill or mixing apparatus and molded into any required form and after being allowed to cool will be ready for use.

To illustrate my said invention and to show one way in which the same may be carried into effect in a practical manner, I would refer to the accompanying drawing which represents a longitudinal axial section of the pug-mill or mixing apparatus in connection with a steam generator.

In the drawing, A represents an ordinary boiler in which steam is generated.

B is the pipe conveying the steam generated in the boiler to and into the pug-mill or mixing apparatus C.

D is a funnel shaped hopper answering the purpose of introducing the carbonaceous or combustible materials to be mixed.

E is an inclined plane upon which the mixed materials are allowed to slide or run into a suitable receiver.

Having now described my invention of an improved mode of treating and combining various combustible matters or substances for the production of artificial fuel, and having explained the manner of carrying the same into effect, I would observe that I claim as my invention:

1. Producing artificial fuel by stirring, mixing, or incorporating coal dust or small coal, peat, turf, lignite or other combustible substances with rosin, pitch, tar or other resinous, bituminous, or carbonaceous matters or substances, in any suitable proportions according to the nature of the materials employed and by causing steam, hot air or gases to pass through the mass during the stirring or mixing operation, or while the carbonaceous and bituminous particles are in motion.

2. I also claim mixing pulverized carbonaceous matters with melted pitch, tar or other bituminous substances when the latter are worked up into a frothy state, as above described.

In testimony whereof I have signed my name to this specification before two subscribing witnesses.

ARCHEREAU.

Witnesses:
S. RICHARDS,
GEO. HUTTON.